(12) United States Patent
Yang et al.

(10) Patent No.: US 10,373,774 B2
(45) Date of Patent: Aug. 6, 2019

(54) HYBRID CIRCUIT BREAKER HAVING A BRIDGE INDUCTION TRANSFER STRUCTURE

(71) Applicant: XI'AN JIAOTONG UNIVERSITY, Xi'an, Shaanxi (CN)

(72) Inventors: Fei Yang, Xi'an (CN); Yi Wu, Xi'an (CN); Mingzhe Rong, Xi'an (CN); Yifei Wu, Xi'an (CN); Chunping Niu, Xi'an (CN)

(73) Assignee: XI'AN JIAOTONG UNIVERSITY, Shaanxi (CN)

( * ) Notice: Subject to any disclaimer, the term of this patent is extended or adjusted under 35 U.S.C. 154(b) by 274 days.

(21) Appl. No.: 15/494,115

(22) Filed: Apr. 21, 2017

(65) Prior Publication Data

US 2018/0138687 A1    May 17, 2018

(30) Foreign Application Priority Data

Nov. 11, 2016 (CN) .......................... 2016 1 0993330 4

(51) Int. Cl.
  *H01H 9/54* (2006.01)
  *H01H 33/59* (2006.01)
  (Continued)

(52) U.S. Cl.
  CPC .......... *H01H 9/542* (2013.01); *H01H 33/596* (2013.01); *H02H 3/087* (2013.01);
  (Continued)

(58) Field of Classification Search
  USPC ....................................................... 361/2–13
  See application file for complete search history.

(56) References Cited

U.S. PATENT DOCUMENTS

2015/0002977 A1*  1/2015  Dupraz .................. H01H 9/542
                                                                361/115
2016/0329179 A1* 11/2016  Kim ...................... H01H 33/596

FOREIGN PATENT DOCUMENTS

CN   103337851   10/2013
CN   105024369   11/2015
          (Continued)

OTHER PUBLICATIONS

1st Office Action from SIPO for Chinese Patent Application No. 2016109933304.
Search Report for Chinese Patent Application No. 2016109933304.

*Primary Examiner* — Danny Nguyen
(74) *Attorney, Agent, or Firm* — Dragon Sun Law Firm, PC; Jinggao Li, Esq.

(57) ABSTRACT

The present disclosure provides a hybrid circuit breaker having a bridge induction transfer structure, characterized in that the circuit breaker comprises a main current circuit, an over-voltage limiting circuit, and a transfer current circuit; and the main current circuit, the over-voltage limiting circuit, and the transfer current circuit are connected in parallel. The induction transfer circuit in the transfer current circuit comprises an induction transfer inductor, an induction transfer capacitor, and an induction transfer branch power semiconductor device which are connected in series; the transfer current circuit further comprises a bridge circuit comprised of a main loop capacitor; the main loop inductor and the induction transfer inductor are coupled to form a transformer. The present invention can implement fast breaking of the current, and effectively reduce the volume and manufacturing cost of the circuit breaker. With the induction transfer circuit, fast current transfer is implemented. The main loop capacitor needs no pre-charging. Isolation between the secondary charging circuit and the main loop is (Continued)

implemented. The transfer speed is fast, and the breaking reliability is high.

8 Claims, 7 Drawing Sheets

(51) Int. Cl.
*H02H 3/087* (2006.01)
*H01H 33/14* (2006.01)
*H02H 3/08* (2006.01)

(52) U.S. Cl.
CPC .............. *H01H 9/548* (2013.01); *H01H 33/14* (2013.01); *H01H 2009/543* (2013.01); *H02H 3/08* (2013.01)

(56) References Cited

FOREIGN PATENT DOCUMENTS

| | | |
|---|---|---|
| CN | 105356435 | 2/2016 |
| JP | 2005222705 | 8/2005 |

* cited by examiner

HYBRID CIRCUIT BREAKER HAVING A BRIDGE INDUCTION TRANSFER STRUCTURE

FIELD OF THE INVENTION

The present disclosure relates to the technical field of electronic devices, and more specifically to a transfer current circuit having a bridge induction transfer structure.

BACKGROUND OF THE INVENTION

A hybrid circuit breaker comprised of a high-speed mechanical switch and power semiconductor devices has advantages such as a large discharge capacity, a fast turn-off speed, and a strong current-limiting capability, and thus has become a hot issue to study in the field of breaking a large capacity system. Compared with other hybrid solutions, a hybrid DC circuit breaker scheme that uses a power semiconductor device with a full control function to break current has advantages such as a faster breaking speed and greater facilitation of breaking rational current. However, when breaking current using the full-control type power semiconductor device, its current transfer loop usually requires the full-control type power semiconductor device to switch off the current, consequently increasing complexity and cost, which restricts its promotion and application.

In a traditional transfer current circuit, a capacitor charging circuit is directly connected to a main loop. Without isolation, interference will occur to a charging power source and the main loop during a breaking process. Moreover, it is highly demanding on voltage-withstanding capability of the main loop charging power supply, and the breaking is not reliable.

SUMMARY OF THE INVENTION

In view of the drawbacks in the prior art, the present disclosure provides a hybrid circuit breaker having a bridge induction transfer structure, the circuit breaker comprising a main current circuit, an over-voltage limiting circuit, and a transfer current circuit; the main current circuit, the over-voltage limiting circuit, and the transfer current circuit are connected in parallel. The transfer current circuit comprises an induction transfer circuit, the induction transfer circuit comprising an induction transfer inductor in which an induction transfer inductor, an induction transfer capacitor, and an induction transfer branch power semiconductor device are connected in series to form a closed loop; the transfer current circuit further comprises a bridge circuit comprised of a first power semiconductor device, a second power semiconductor device, a third power semiconductor device, a fourth power semiconductor device, a main loop inductor, and a main loop capacitor; the main loop inductor and the induction transfer inductor are coupled to form a transformer.

Preferably, the bridge circuit has the following connection relationships: the first power semiconductor device is connected in series with the third power semiconductor device, the second power semiconductor device is connected in series with the fourth power semiconductor device, and between the first power semiconductor device and the third power semiconductor device is provided a first endpoint; between the second power semiconductor device and the fourth power semiconductor device is provided a second endpoint; the main loop inductor and the main loop capacitor are serially connected between the first endpoint and the second endpoint.

Preferably, the first power semiconductor device, the second power semiconductor device, the third power semiconductor device, and the fourth power semiconductor device are unidirectional conduction power semiconductor devices; the transfer branch power semiconductor device is a bidirectional power semiconductor device.

Preferably, the main current circuit comprises a high-speed mechanical switch; the high-speed mechanical switch is an electromagnetic repulsion-based high-speed mechanical switch, a high-speed motor-driven mechanical switch or an explosion-driven high-speed mechanical switch.

Preferably, the main loop capacitor and the induction transfer capacitor are hollow inductors or magnetic core-contained inductors, formed by one or more inductors connected in series or in parallel; the main loop inductor and the induction transfer inductor in the transfer current circuit are coupled into mutual inductors that are mutually coupled.

Preferably, the first power semiconductor device, the second power semiconductor device, the third power semiconductor device, and the fourth power semiconductor device are uncontrollable power semiconductor devices or semi-control enabled power semiconductor devices, or combinations thereof, including, but not limited to, any one of a power diode, a thyristor, an IGCT, an IGBT, and GTO, or any combination of more thereof.

Preferably, the over-voltage limiting circuit is one of an arrester consisting of a zinc oxide valve block or a varistor, or a combination thereof.

Preferably, design parameters of the over-voltage limiting circuit comprises: a voltage limiting circuit capacity, a conduction voltage threshold, current when reaching a conduction voltage, a highest clamping voltage, and current at the highest clamping voltage.

The present disclosure has the following advantages: the transfer current circuit uses a bridge structure and implements fast breaking of current using a capacitance and an induction branch connected in series, thereby effectively reducing the size and manufacturing cost of the circuit breaker. By implementing fast transfer of current using an induction transfer module, the main loop capacitor doesn't need to be pre-charged, which realizes isolation between the secondary charging circuit and the main loop, resulting in a fast transfer speed. Meanwhile, the main loop capacitor only needs unidirectional charging, which may reduce the size and cost of the capacitor with a high breaking reliability.

BRIEF DESCRIPTION OF THE ACCOMPANYING DRAWINGS

Hereinafter, the embodiments of the present disclosure will be described in further detail with reference to the accompanying drawings.

Figure 5:
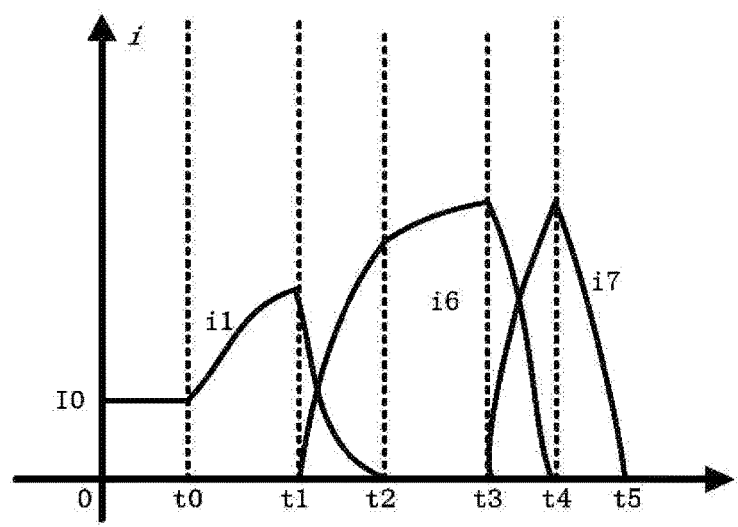
Figure 6:
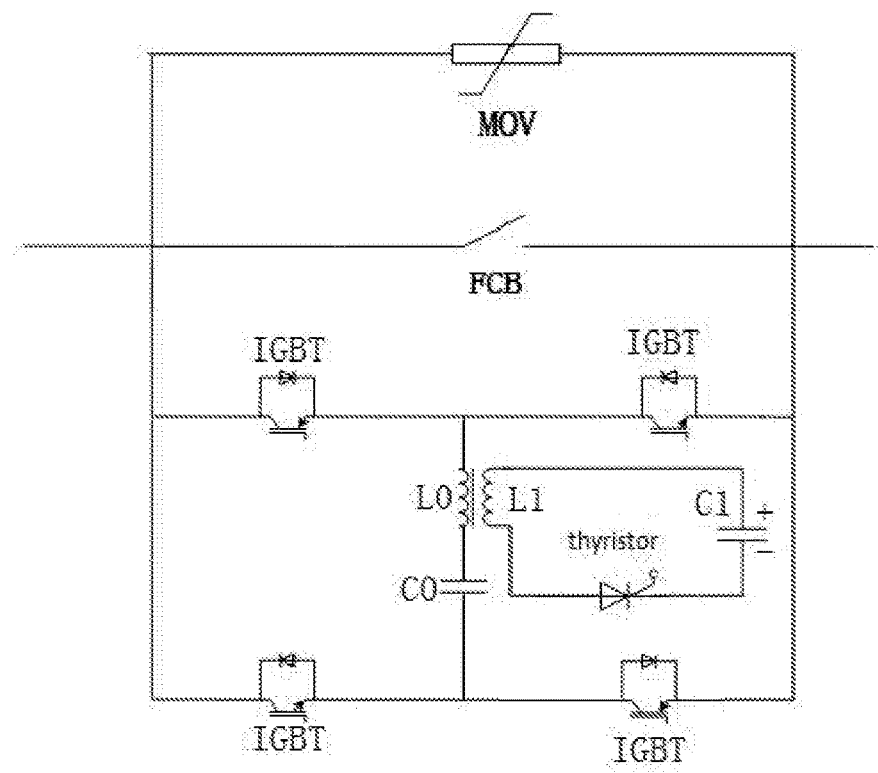
Figure 7:
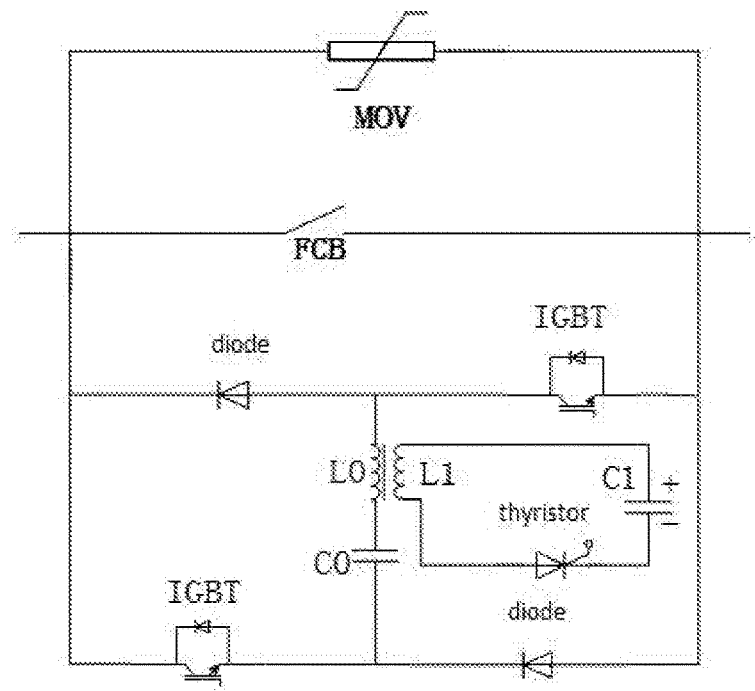
Figure 8:
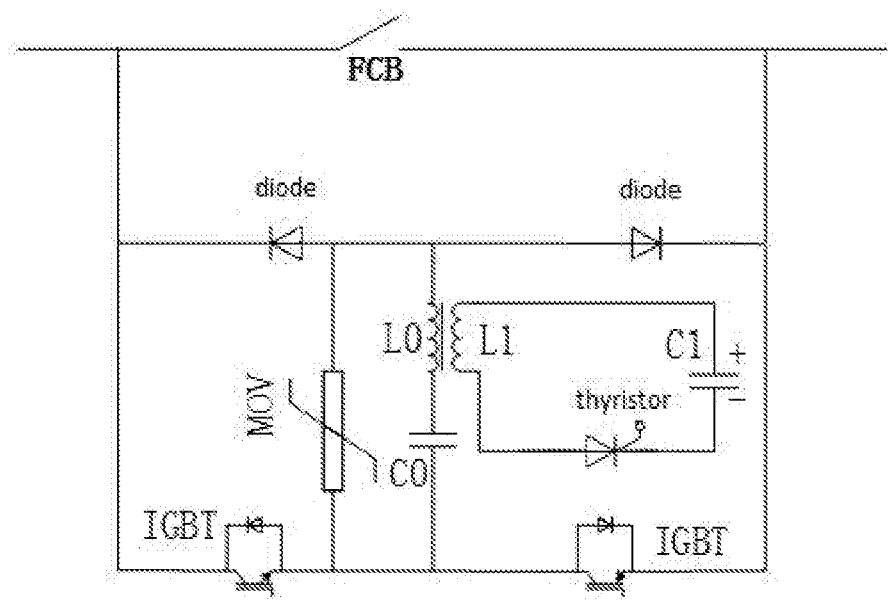
Figure 9:
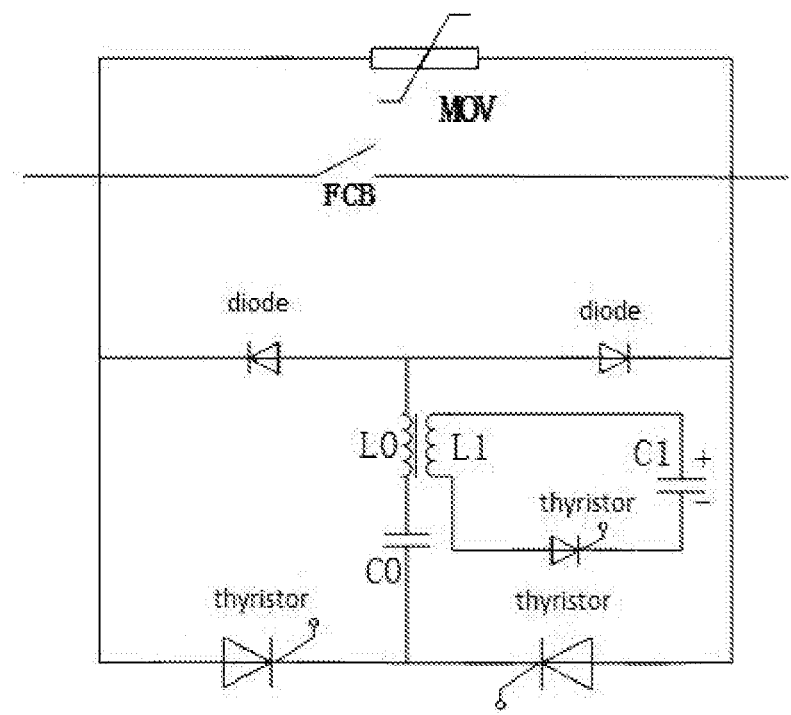
Figure 10:
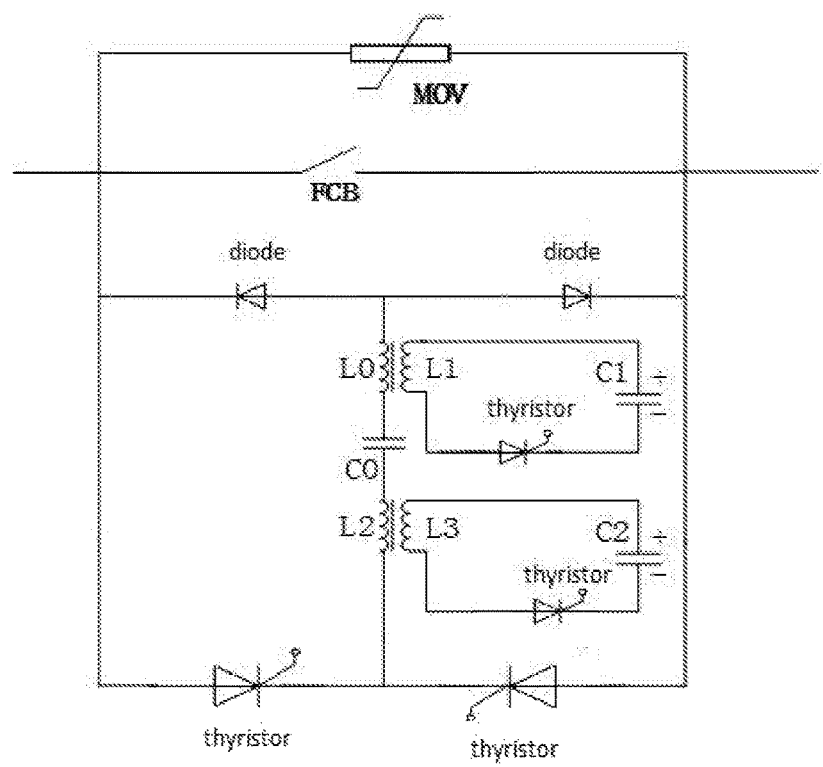
Figure 11:
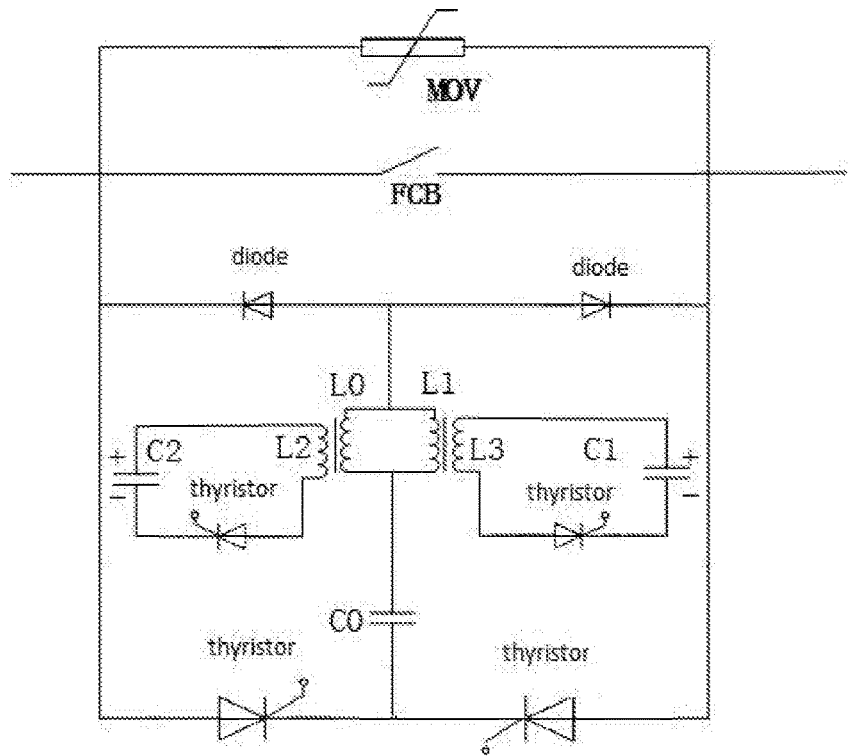

FIGS. 4(a)-4(e) show diagrams of current directions of respective circuits when breaking current;

FIG. 5 shows a curve of current change in respective circuits when breaking current;

FIG. 6 shows a structural diagram of one embodiment of the present disclosure;

FIG. 7 shows a structural diagram of one embodiment of the present disclosure;

FIG. 8 shows a structural diagram of one embodiment of the present disclosure;

FIG. 9 shows a structural diagram of one embodiment of the present disclosure;

FIG. 10 shows a structural diagram of one embodiment of the present disclosure;

FIG. 11 shows a structural diagram of one embodiment of the present disclosure.

DETAILED DESCRIPTION OF THE PREFERRED EMBODIMENTS

To enable those skilled in the art to better understand the solution of those skilled in the art, the technical solutions in the embodiments of the present disclosure will be described clearly and comprehensively in conjunction with FIGS. 1-11 in the embodiments of the present disclosure. Apparently, the embodiments described here are only part of embodiments of the present disclosure, instead of all embodiments. Based on the embodiments in the present disclosure, all other embodiments obtained by a person of normal skill in the art without exercise of inventive work should fall within the scope sought to protect in the present disclosure.

Hereinafter, the detailed description is only exemplary, not intended to limit application and usage. In addition, it is not intended to be subjected to any explicit or implicit theoretical restrictions presented in the Technical Field, Background, Summary, which are mentioned above, or the detailed depiction below. unless otherwise depicted explicitly, the word "comprise" and its variants should be understood as implicitly including a component(s), but not excluding any other components.

Hereinafter, the preferred embodiments of the present disclosure will be described in conjunction with the accompanying drawings.

Figure 1:
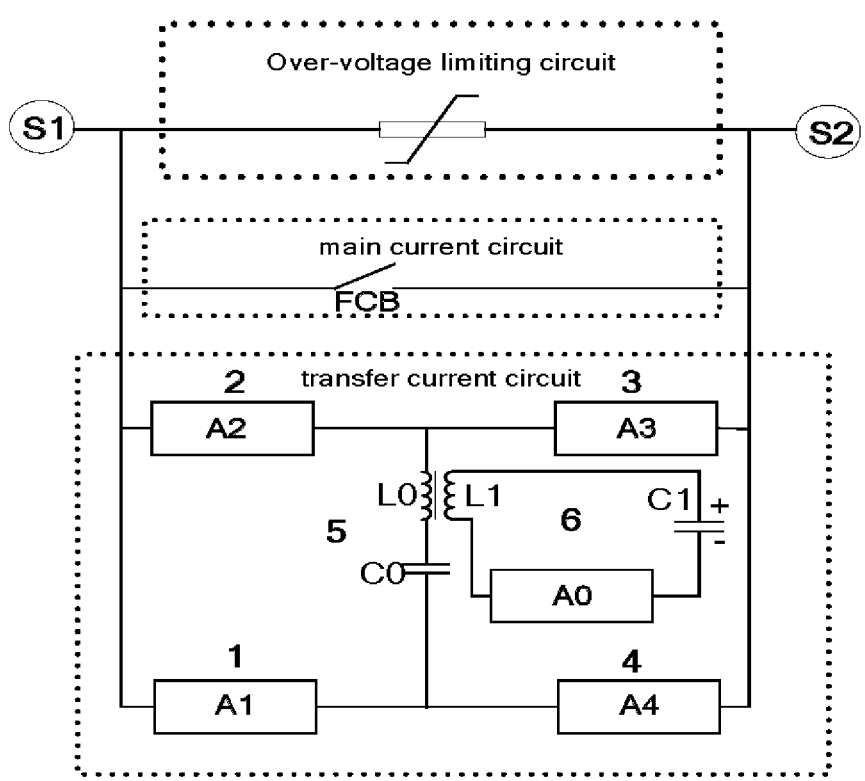
FIG. 1 shows a structural diagram of a circuit breaker body.
Figure 2:
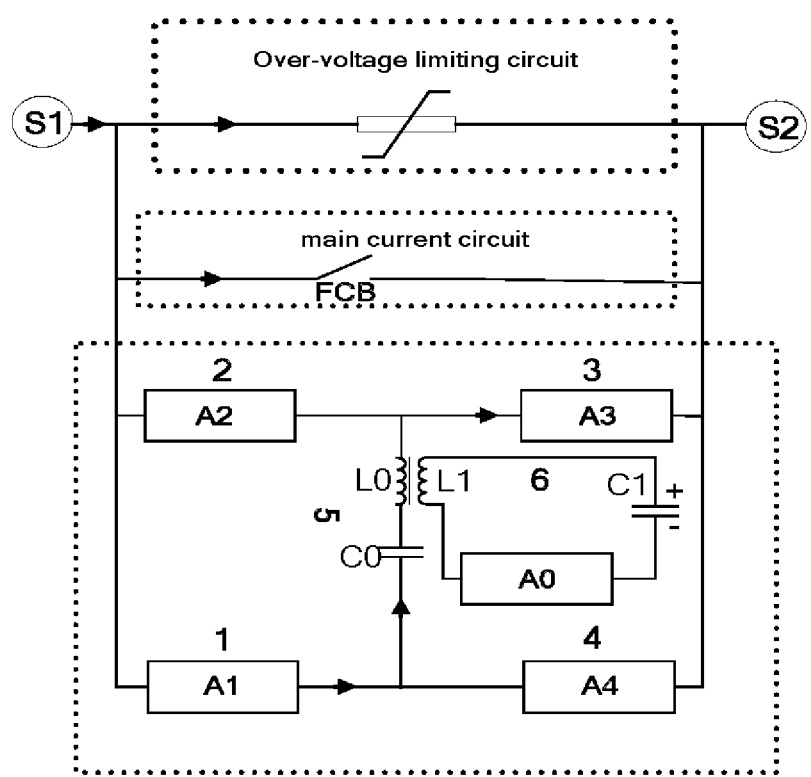
FIG. 2 shows a structural diagram when the circuit breaker of the present disclosure is working.

The present embodiment provides a hybrid circuit breaker having a bridge induction transfer structure, as shown in FIG. 1, comprising a main current circuit, a transfer current circuit, and an over-voltage limiting circuit. In order to better illustrate the breaking process of the circuit breaker, the present embodiment illustrates a structural diagram of the circuit breaker with current from a system access end S1 to a system access end S2, as illustrated in FIG. 2. The current directions of the power semiconductor devices in FIG. 2 are identical to the arrow directions of first to fourth power semiconductor devices A0-A4 in the figure.

With reference to FIGS. 1 and 2, it is seen that the circuit breaker comprises a main current circuit, a transfer current circuit, and an overvoltage limitation; moreover, the transfer current circuit comprises an induction transfer module; the main current circuit, the transfer current circuit, and the overvoltage limiting circuit are connected in parallel.

The main current circuit comprises a high-speed mechanical switch.

The transfer current circuit comprises a circuit 1 comprised of a power semiconductor device A1, a circuit 2 comprised of a power semiconductor device A2, a circuit 3 comprised of a power semiconductor device A3, a circuit 4 comprised of a power semiconductor device A, and a circuit 5 comprised of an inductor L0 and a capacitor C0, and a circuit 6 comprised of an induction transfer module formed by an inductor L1, a capacitor C1, and a power semiconductor device A0 connected in series, wherein the circuit 1 is connected in series with the circuit 4, and the circuit 2 is connected in series with the circuit 3.

Particularly, the circuit 1 and the circuit 4 are connected in series to form a transfer current circuit branch 1-4 that is connected in series with the main current circuit; moreover, one end of the main current circuit is connected to one end of the power semiconductor device A1 so as to effectuate a connection with one end of the branch 1-4; the other end of the power semiconductor device A1 is connected to one end of the power semiconductor device A4 to effectuate a serial connection between the circuit 1 and the circuit 4; the other end of the power semiconductor device A4 is connected to the other end of the main circuit so as to effectuate a connection between the other end of the branch 1-4 and one end of the main current circuit, thereby realizing a parallel connection between the branch 1-4 and the main current circuit.

The circuit 2 and the circuit 3 are connected in series to form a transfer current circuit branch 2-3 that is connected in parallel to the main current circuit; moreover, one end of the main current circuit is connected to one end of the power semiconductor device A2 so as to effectuate a connection to one end of the branch 2-3; the other end of the power semiconductor device A2 is connected to one end of the power semiconductor device A3 so as to effectuate a serial connection between the circuit 2 and the circuit 3; the other end of the power semiconductor device A3 is connected to the other end of the main current circuit so as to effectuate a connection between the other end of the branch 2-3 and the other end of the main current circuit, thereby effectuating a parallel connection between the branch 2-3 and the main current circuit.

An endpoint is provided between the circuit 1 and the circuit 4, and an endpoint is provided between the circuit 2 and the circuit 3. A branch comprised of the serially connected inductor L0 and the capacitor C0 is connected between the two endpoints.

Particularly, the power semiconductor devices A0-A4 are uncontrollable or semi-control enabled power semiconductor devices or combinations thereof. The power semiconductor devices include, but not limited to any of a power diode, a thyristor, an IGCT, an IGBT, and a GTO, or any combination of more thereof. It should be noted that not only the semi-control devices have a semi-control function, the full-control devices also have a semi-control function.

Particularly, the high-speed mechanical switch may be any of an electromagnetic repulsion-based high-speed mechanical switch, a high-speed motor-driven mechanical switch or an explosion-driven high-speed mechanical switch.

The inductor L0 of the main loop and the inductive transfer inductor L1 are hollow inductors or magnetic core-contained inductors, formed by one or more inductors connected in series or in parallel; the inductor L0 of the main loop in the transfer current circuit and the induction transfer inductor L1 are coupled to form a pair of mutual inductors;

The over-voltage limiting circuit one of an arrester consisting of a zinc oxide valve block or a varistor, or a combination thereof.

It is easily understood that in the art, the circuit breaker may also comprise a control system or a controller so as to control on and off of relevant components in the circuit breaker.

1. On and Off Processes of the Over-Voltage Limiting Circuit

Figure 3:
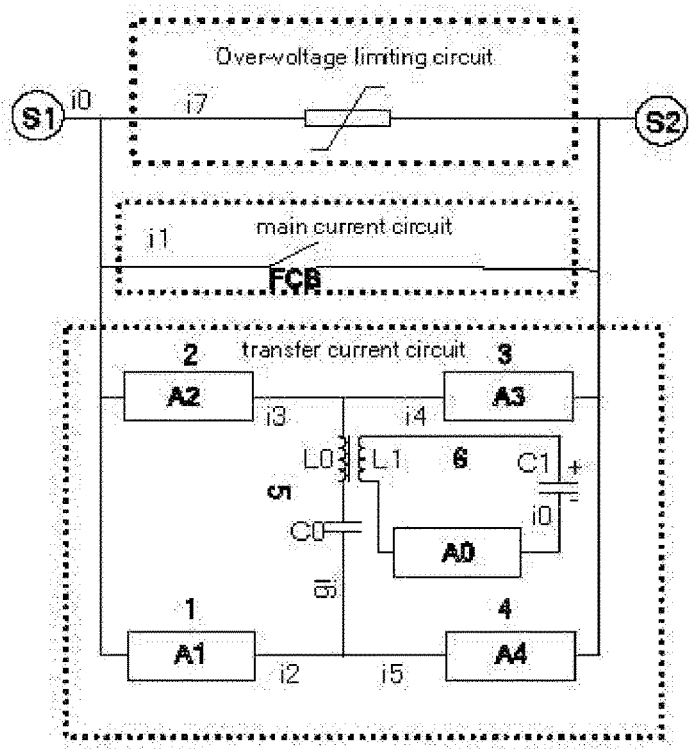
FIG. 3 shows a schematic diagram of current of a transfer current circuit when breaking current.

FIG. 3 shows a volt-ampere characteristic curve of an over-voltage limiting circuit, wherein U1 denotes a conduction threshold voltage of the over-voltage limiting circuit, and U2 denotes a highest voltage when the over-voltage limiting circuit has a voltage clamping function. When the voltage at two ends of the over-voltage limiting circuit is lower than U1, the over-voltage limiting circuit is cut-off, and its drain current is lower than 1 μA, i.e., in an off state. After the voltage at two ends of the voltage limiting circuit reaches its conduction threshold, with dramatic increase of current, the voltage at two ends of the over-voltage limiting circuit varies little. Design parameters of the over-voltage limiting circuit include: capacity (absorbed energy) of the voltage limiting circuit, conduction voltage threshold, current when reaching the conduction voltage, the highest clamping voltage, and current at the highest clamping voltage. When the current is greater than the current at the highest clamping voltage, the over-voltage limiting circuit will lose the function of voltage clamping, and the over-voltage limiting action fails. Usually, the conduction threshold of the over-voltage limiting circuit is 1.5 times of a normal operation state, i.e., after the over-voltage limiting circuit is turned on, due to its voltage clamping function, when current (larger than 1 mA) exists in its inside, the voltage at two ends is higher than the system voltage; till the system current is lowerer than 1 mA, the over-voltage limiting circuit is cut-off and switched-off.

2. Breaking Procedure of the Hybrid Circuit Breaker

FIG. 3 simultaneously shows current marks of respective branches of the transfer current circuit when breaking current, wherein i0 denotes current flowing into the circuit breaker, i1 denotes current flowing through the main current circuit, i2 denotes current flowing through the circuit 1, i3 denotes current flowing through the circuit 2, i4 denotes current flowing through the circuit 3, i5 denotes current flowing through the circuit 4, i6 denotes current flowing through the circuit 5, i7 denotes current flowing through the over-voltage limiting circuit, and i0 denotes current in the induction transfer module.

Figure 4:
Figure 4:
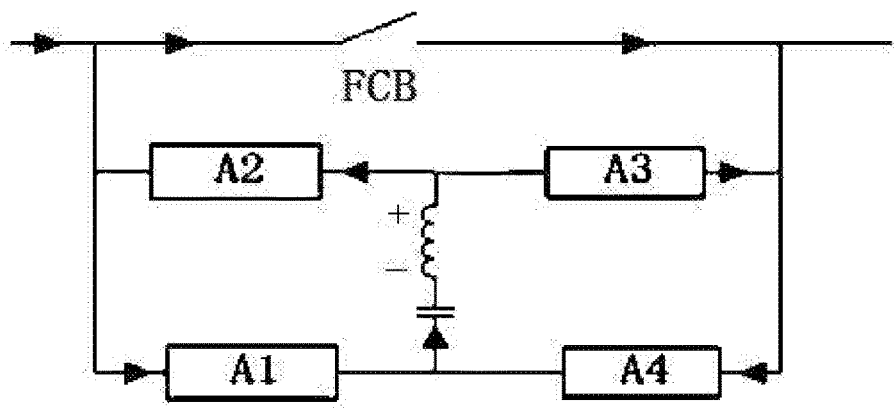
Figure 4:
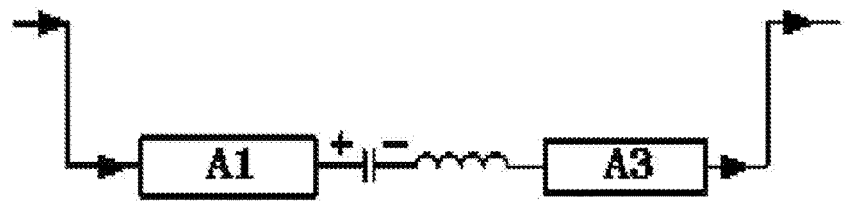
Figure 4:
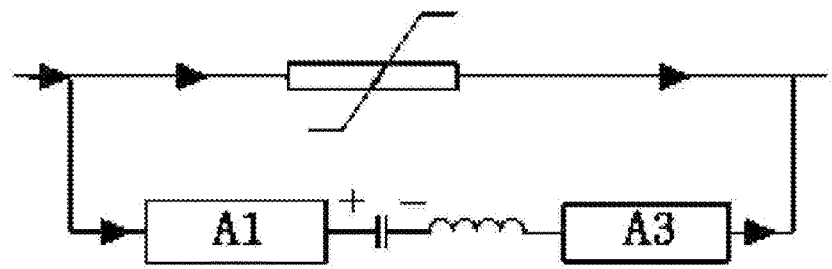
Figure 4:
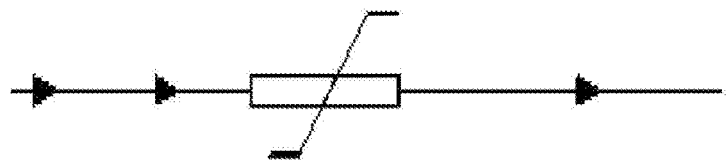

FIGS. 4(*a*)-4(*e*) show diagrams of current directions of respective circuits in the transfer current circuit when breaking current, specifically respective branch current directions corresponding to times from t0 to t5. At the ease of depiction, the branch where the inductor L0 and the capacitor C0 are serially connected in the transfer current circuit is denoted as a module A5. FIG. 5 shows current change curves of respective branches when breaking current.

The working procedure of the circuit breaker of the present disclosure will be described exemplarily, including the following aspects:

The system operates normally. All current flows through the main current circuit. As shown in FIG. 5, the rational current of the system is 10.

At time t0, the system has a short-circuit fault. Current of the main current circuit starts rising. Between t0 and t1, when the current exceeds a system short-circuit threshold, the system is controlled to act, and the mechanical switch begins to act.

At time t1, enough arc voltage is established between mechanical contacts; the control system conducts A1, A3, and A0; the current transfer branch is on, an inductive induction module circuit is turned on, and the capacitor C1 starts discharging; a coupling inductance causes an induction voltage to be generated at two ends of the inductor L0 in the transfer current circuit; and the inductor L0 and the capacitor C0 start discharging. Current flowing through the main current circuit is transferred to the transfer current branch. A portion of an inductor-capacitor serially-connected branch exceeding the short-circuit current will flow on the power semiconductor devices A2 and A4, as shown in FIG. 5.

At time t2, the mechanical switch is completely switched on; all of the main circuit current is transferred to the transfer current branch, as shown in FIG. 5.

Between t2 and t3, the transfer current branch withstands all short-circuit current, and the short-circuit current rises gradually.

At time t3, when a voltage value of the short-circuit current for charging the capacitor C0 reaches a conduction threshold of the over-voltage limiting circuit, the over-voltage limiting circuit is turned on. As shown in FIG. 5, the current starts being transferred to the over-voltage limiting circuit. Due to the voltage clamping function of the over-voltage limiting circuit, the voltage at both ends of the circuit breaker rises in a very small amplitude.

At time t4, all current in the transfer current branch is transferred to the over-voltage limiting circuit. At this point, the voltage at both ends of the circuit breaker reaches a highest value, i.e., an over-voltage peak value at both ends of the circuit breaker during a breaking process. Afterwards, current in the over-voltage limiting circuit starts falling, and the voltage at both ends of the circuit breaker also starts falling slowly. When the system current is lower than a minimum on current 1 mA of the over-voltage limiting current, the over-voltage limiting circuit is switched-off, and the voltage at both ends of the over-voltage limiting circuit drops rapidly.

At time t5, the current in the over-voltage limiting circuit is 0; the capacitor C1 in the induction transfer module is recharged; breaking of the circuit breaker is completed; and the voltage at both ends of the circuit breaker drops to the system voltage.

Preferably, the high-speed mechanical switch is an electromagnetic repulsion-based high-speed mechanical switch, a high-speed motor-driven mechanical switch or an explosion-driven high-speed mechanical switch.

The semi-control enabled power semiconductor device includes any one of a thyristor, an IGCT, an IGBT, and GTO, or any combination of more thereof.

The full-control power semiconductor device includes any one of IGBT and GTO or any combination of more thereof.

FIGS. 6-9 show preferred embodiments in which specific devices IGBT and thyristor are used as power semiconductor devices.

The over-voltage limiting circuit is one of an arrester consisting of a zinc oxide valve block or a varistor, or a combination thereof. It should be noted that the over-voltage limiting circuit may be parallel connected between two ends of the circuit 1 and circuit 4 (i.e., between high-speed switch and A0) or between two ends of the circuit 5, as shown in FIG. 8.

FIGS. 10 and 11 show scenarios in which the induction transfer module may be a combination of one or more; the inductor is a hollow inductor or a magnetic core-contained inductor, formed by one or more inductors connected in series or in parallel.

Besides the scenarios as shown in the drawings, the present disclosure does not require complete symmetry in the circuit breaker.

The present disclosure discloses a hybrid circuit breaker having a bridge induction transfer structure, comprising a main current circuit, a transfer current circuit, and an over-voltage limiting circuit. The transfer current circuit has a bridge structure formed by the inductor-capacitor serially connected branch and four power semiconductor devices and comprises an induction transfer module. When the circuit breaker needs to break current, by controlling the power semiconductor devices of the transfer current circuit and the main current circuit to act according to a certain time sequence, the induction transfer module is triggered to discharge, and the transfer current circuit is conducted; by isolating the circuit breaker main loop and the secondary charging circuit, the reliability of breaking may be significantly enhanced. Meanwhile, the present invention adopts an induction transfer module comprised of mutual inductors, pre-charged capacitor, and power semiconductor devices which are connected in series, which reduces the demand on capacitor capacity by the transfer current circuit and effectively reduces the volume of the capacitor in the transfer current circuit; moreover, the pre-charging voltage of the capacitor in the induction transfer module is very low, which guarantees effective electrical isolation between the secondary charging circuit and the circuit breaker main current circuit and between the transfer current circuit and the limiting voltage circuit and enhances the reliability of breaking.

The content above is a further detailed depiction of the present invention in conjunction with specific preferred embodiments. It should not be regarded that the preferred embodiments of the present invention are limited thereto; to those skilled in the art, several simple deductions or substitutions may also be made without departing from the idea of the present invention, which should be regarded as falling within the protection scope determined by the submitted claims.

The invention claimed is:

1. A hybrid circuit breaker having a bridge induction transfer structure, characterized in that the circuit breaker comprises a main current circuit, an over-voltage limiting circuit, and a transfer current circuit; and the main current circuit, the over-voltage limiting circuit, and the transfer current circuit are connected in parallel;
   the transfer current circuit comprises an induction transfer circuit (6), the induction transfer circuit (6) comprising an induction transfer inductor (L1), an induction transfer capacitor (C1), and an induction transfer branch power semiconductor device (A0) which are connected in series to form a closed loop;
   the transfer current circuit further comprises a bridge circuit comprised of a first power semiconductor device (A1), a second power semiconductor device (A2), a third power semiconductor device (A3), a fourth power semiconductor device (A4), a main loop inductor (L0), and a main loop capacitor (C0);
   the main loop inductor and the induction transfer inductor (L1) are coupled to form a transformer.

2. The hybrid circuit breaker according to claim 1, characterized in that the bridge circuit has the following connection relationships: the first power semiconductor device (A1) is connected in series with the third power semiconductor device (A3), the second power semiconductor device (A2) is connected in series with the fourth power semiconductor device (A4), and between the first power semiconductor device (A1) and the third power semiconductor device (A3) is provided a first endpoint; between the second power semiconductor device (A2) and the fourth power semiconductor device (A4) is provided a second endpoint; the main loop inductor (L0) and the main loop capacitor (C0) are serially connected between the first endpoint and the second endpoint.

3. The hybrid circuit breaker according to claim 1, characterized in that the first power semiconductor device (A1), the second power semiconductor device (A2), the third power semiconductor device (A3), and the fourth power semiconductor device (A4) are unidirectional conduction power semiconductor devices; the transfer branch power semiconductor device (A0) is a bidirectional power semiconductor device.

4. The hybrid circuit breaker according to claim 1, characterized in that the main current circuit comprises a high-speed mechanical switch; the high-speed mechanical switch is an electromagnetic repulsion-based high-speed mechanical switch, a high-speed motor-driven mechanical switch or an explosion-driven high-speed mechanical switch.

5. The hybrid circuit breaker according to claim 1, characterized in that the inductor (L0) of the main loop and the inductive transfer inductor (L1) of the transfer current circuit are coupled to form a mutually coupled mutually inductive coil, L0 and L1 are hollow inductors or magnetic core-contained inductors, and comprise one or more inductors connected in series or in parallel.

6. The hybrid circuit breaker according to claim 1, characterized in that the first power semiconductor device (A1), the second power semiconductor device (A2), the third power semiconductor device (A3), and the fourth power semiconductor device (A4) are uncontrollable power semiconductor devices or semi-control enabled power semiconductor devices, or combinations thereof, including, but not limited to, any one of a power diode, a thyristor, an IGCT, an IGBT, and GTO, or any combination of more thereof.

7. The hybrid circuit breaker according to claim 1, characterized in that the over-voltage limiting circuit is one of an arrester consisting of a zinc oxide valve block or a varistor, or a combination thereof.

8. The hybrid circuit breaker according to claim 1, characterized in that design parameters of the over-voltage limiting circuit comprises: a voltage limiting circuit capacity, a conduction voltage threshold, current reaching a conduction voltage, a highest clamping voltage, and current at the highest clamping voltage.

* * * * *